United States Patent
Thomas et al.

(10) Patent No.: US 6,271,514 B1
(45) Date of Patent: Aug. 7, 2001

(54) MULTI-BEAM SCANNER INCLUDING A DOVE PRISM ARRAY

(75) Inventors: Timothy N. Thomas, Portland; Paul C. Allen, Beaverton, both of OR (US)

(73) Assignee: Etec Systems, Inc., Hayward, CA (US)

( * ) Notice: Subject to any disclaimer, the term of this patent is extended or adjusted under 35 U.S.C. 154(b) by 0 days.

(21) Appl. No.: 09/272,947

(22) Filed: Mar. 19, 1999

(51) Int. Cl.[7] ....................................... H01J 3/14
(52) U.S. Cl. .................. 250/234; 359/205; 359/640; 347/241; 347/256
(58) Field of Search ..................... 359/197, 205–206, 359/212–216, 234, 237–238, 285–287, 305, 619–620, 625, 627–628, 640, 831, 833; 250/234–236; 355/81, 84; 347/225, 233, 239, 241, 243–244, 255–256, 258–261

(56) References Cited

U.S. PATENT DOCUMENTS

| | | | |
|---|---|---|---|
| 4,110,796 | 8/1978 | Aughton | 358/298 |
| 4,796,038 | 1/1989 | Allen et al. | 396/548 |
| 4,956,650 | * 9/1990 | Allen et al. | 347/244 |
| 5,386,221 | 1/1995 | Allen et al. | 347/239 |
| 5,631,762 | 5/1997 | Kataoka | 359/204 |
| 5,923,359 | * 7/1999 | Montgomery | 347/255 |

FOREIGN PATENT DOCUMENTS 92307098  10/1993  (EP).

* cited by examiner

Primary Examiner—Jordan M. Schwartz
(74) Attorney, Agent, or Firm—Kenneth C. Brooks (57) ABSTRACT

A precision printing system uses multiple scan beams that an acousto-optic modulator (AOM) separately modulates. An array of optical elements such as dove prisms separately rotates each of the beams about a central ray of the beam to eliminate blurred edges, skew, and variations in line thickness caused by the direction of propagation of acoustic waves in the AOM being at an angle to a scan direction. In particular, the amount of rotation is selected so that in the final image the direction in which illumination progresses across a cross-section of a beam is in a direction opposite the scan direction. A method of making the array includes attaching rods to a flat, grinding or polishing the combination of the rods and flat to form three planar regions that correspond to facets on prisms. Removing the rods/prisms from the flat. Using photolithography and etching to form grooves in a substrate, and a mounting the rods/prisms in the grooves on the substrate. Integrated circuit processing techniques that control the spacing, widths, and depths of the grooves provide precise control of critical alignment of the prisms.

21 Claims, 7 Drawing Sheets

MULTI-BEAM SCANNER INCLUDING A DOVE PRISM ARRAY

CROSS REFERENCE TO RELATED APPLICATION

This patent document is related to and incorporates by reference in its entirety, co-filed U.S. patent application Ser. No. 09/273,115, entitled "Laser Pattern Generator", filed Mar. 19, 1999.

BACKGROUND

1. Field of the Invention

This invention relates to printing systems using multiple scan beams and particularly to optical systems associated with acousto-optic modulators in such systems.

2. Description of Related Art

Figure 1A:
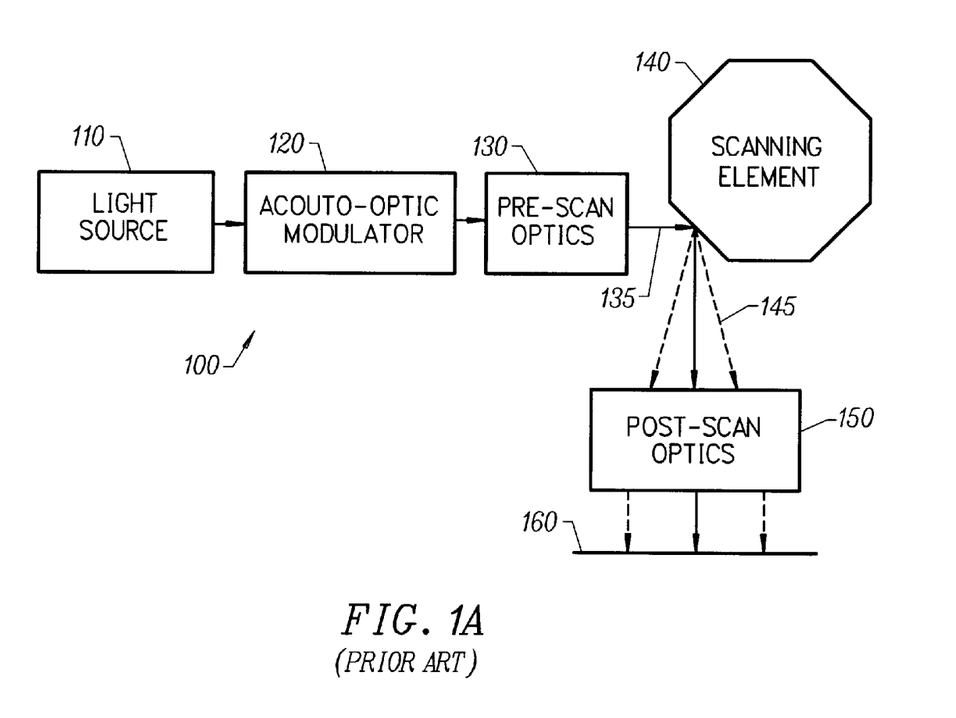
FIG. 1A shows a prior art printing system.

Printing systems including scanners are suitable for a variety of applications including printing text on paper, patterning photoresist during integrated circuit manufacture, and creating masks or reticules for projection-type photolithography systems. For integrated circuit applications, the printing systems typically require submicron precision. FIG. 1A illustrates the basic architecture of a precision printing systems 100 that employs scanning. System 100 includes: a light source 110 such as a laser; an acousto-optic modulator 120 that controls intensity of one or more input beams 135; prescan optics 130 that control the position, shape, and collimation of input beams 135; a scanning element 140 such as a polygon mirror that sweeps scan beams 145 along a scan direction; and post-scan optics 150 that focus scan beams 145 on an image plane 160. Scanning of scan beams 145 forms scan lines that expose a pattern in an image area of plane 160. Acousto-optic modulator 120 modulates the intensity of input beams 135 to select the pattern that scan beams 145 expose in image plane 160.

Figure 1B:
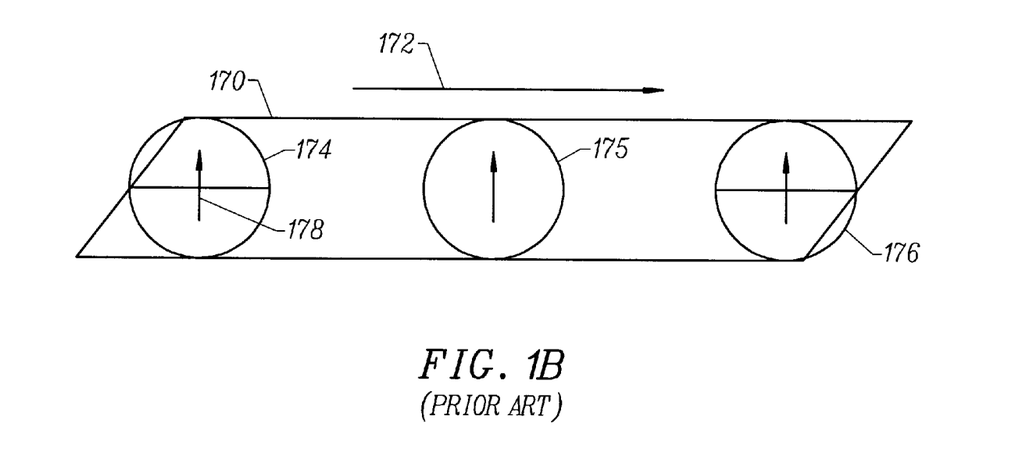
FIG. 1B illustrates the relation between the cross-section of a scan beam that is being turned on and then off and the shape of a resulting illuminated region.

A conventional acousto-optic modulator includes a block of material such as fused silica through which input beams propagate. To turn on, turn off, or change the intensity of an input beam, a transducer generates an acoustic wave that crosses the path of the input beam in the block. The acoustic wave locally changes the optical properties of the block and deflects part of the input beam. A beam stop later in the optical train blocks the undeflected part of the beam. A concern for a precision scanner having a conventional acousto-optic modulator is the orientation of the scanning direction relative to propagation of the acoustic waves that modulate the input beams. If the propagation direction and the scanning direction are not collinear, turning beams on or off can reduce sharpness of edges or create undesired skew or directional bias in a pattern being illuminated. FIG. 1B illustrates an illuminated region 170 of a scan line formed when an acoustic wave deflects an input beam in a direction 178 (after convolution through the system optics 130 and 150) that is perpendicular to a scan direction 172. Deflection direction 178 typically corresponds to the direction of propagation of the acoustic wave. As acousto-optic modulator 120 turns on input beam 135, a cross-section 174 of the beam expands in direction 178. Accordingly, the initially illuminated part of region 170 is narrow and toward one edge until the input beam has a fully illuminated cross-section such as cross-section 175. Similarly, when acousto-optic modulator 120 turns off input beam 135, one edge of the input beam darkens first, and a shrinking cross-section 176 of the beam causes illuminated region 170 to recede toward the opposite edge. This reduces sharpness at the edges of illuminated regions formed by multiple scan lines, skews rectangular illuminated areas, and causes pattern lines at 45° to the scan direction to differ in thickness from pattern lines at 135° to the scan direction.

Figure 1C:
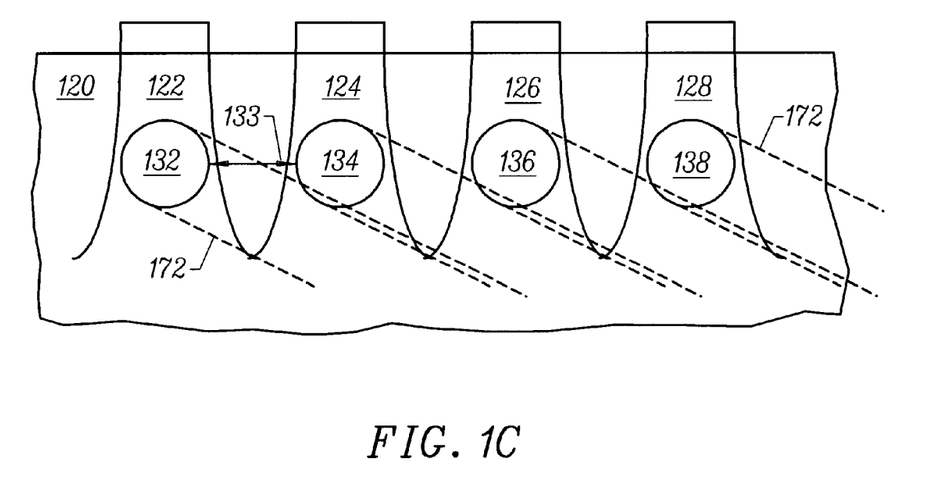
FIG. 1C shows the orientation of the scan direction, multiple source beams, and multiple acoustic waves that separately modulate the scan beams in an acousto-optic modulator.

Acoustic waves in an acousto-optic modulator propagating opposite the scan direction (after convolution through scanner optics) eliminates skew and 45°/135° bias and sharpens edges of illuminated regions. However, in scanning systems using multiple beams, projections of the scan beams along the scan direction typically overlap. For example, as shown in Fig. 1C, beams 132, 134, 136, and 138 overlap when viewed along scan direction 172. This creates a brush that illuminates a strip in the image plane without gaps between adjacent beams. With this configuration, an acoustic wave propagating along or opposite scan direction 172 would affect multiple beams. Generally, the separation 133 between beams inside acousto-optic modulator 120 must be more than a beam diameter to permit acoustic waves 122, 124, 126, and 128 to independently modulate respective beams 132, 134, 136, and 138. Accordingly, to provide independent control of the intensities of beams 132, 134, 136, and 138, acoustic waves 122, 124, 126, and 128 in acousto-optic modulator 120 must propagate at an angle relative to scan direction 172.

Systems and methods are sought that use simultaneous scan beams for faster scanning but avoid the skew, blurred edges, and directional bias associated with acousto-optic modulators having acoustic waves propagating at an angle to the scan direction.

SUMMARY

In accordance with the invention, a multi-beam scanner includes an array of optical elements such as dove prisms. Each optical element effectively rotates the direction in which illumination progress across the cross-section of an associated beam when an acousto-optic modulator turns on the beam. The amount of rotation is selected so that at the image plane where scan lines form, the beams cross-sections expand or brighten along a direction opposite the scan direction.

One embodiment of the invention is a scanning system that includes: a source of multiple beams; a modulator positioned to separately control intensities of the beams, an array of optical elements associated with the beams; a scanning element that sweep the beams along a scanning direction; and post-scan optics that direct the beams to form scan lines in an image plane. When the modulator turns on one of the beams, illuminated areas in a cross-section of the beam progress in a brightening direction. Each optical element acts on the associated beam to change brightening direction so that in the image plane the brightening direction is along or opposite the scanning direction. In one specific embodiment, the array of optical elements is an array of dove prisms.

To avoid varying in the relative positions of beams, dove prisms in an array have uniform geometry and are uniformly positioned relative to central axes of the beams. A process for making dove prisms with uniform geometry attaches multiple rods or pieces of fiber optic material to an optical flat with sides of the rods in contact to keep the rods parallel to each other. The combined assembly including the rods and the flat are then ground or polished to form planar surfaces at opposite ends of the rods. Forming these planar surface forms front and back facets of the dove prisms. The lengths of the dove prisms (i.e., the distances between front and back facets) are uniform since all rods are polished at once. A top surface of the assembly is ground or polished to form side facets where total internal reflections occur in the dove prisms. Once polishing of the assembly forms the dove prisms, the dove prisms are removed from the optical flat for mounting on a substrate to form the array. To prepare the substrate, known integrated circuit processing techniques such as photolithography and etching form parallel grooves with precise spacing, shape, and size in the substrate. The dove prisms are placed in the grooves with the side facets of the dove prisms oriented as required to rotate each beam by the desired amount.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a precision printing system employing a scanner and multiple scan beams includes an array of dove prisms. An acousto-optic modulator or deflector in the printing system controls the intensities of the scan beams. As the acousto-optic modulator turns a beam on or off, successive portions of a scan beam cross-section brighten or darken along the direction of propagation of acoustic waves in the acousto-optic modulator. Each dove prism in the array independently rotates the direction of brightening of an associated scan beam so that in the image plane of the printing system, the scan beams brighten in a direction along or opposite the scan direction. To create a dove prism array with suitable accuracy for precision printing, a rigid or crystalline substrate, such as silicon, is etched with a series of parallel grooves for mounting of the dove prisms. Placing dove prisms formed from fiber-optic material or fine silica rods in the grooves precisely aligns the prisms in the array.

Figure 2:
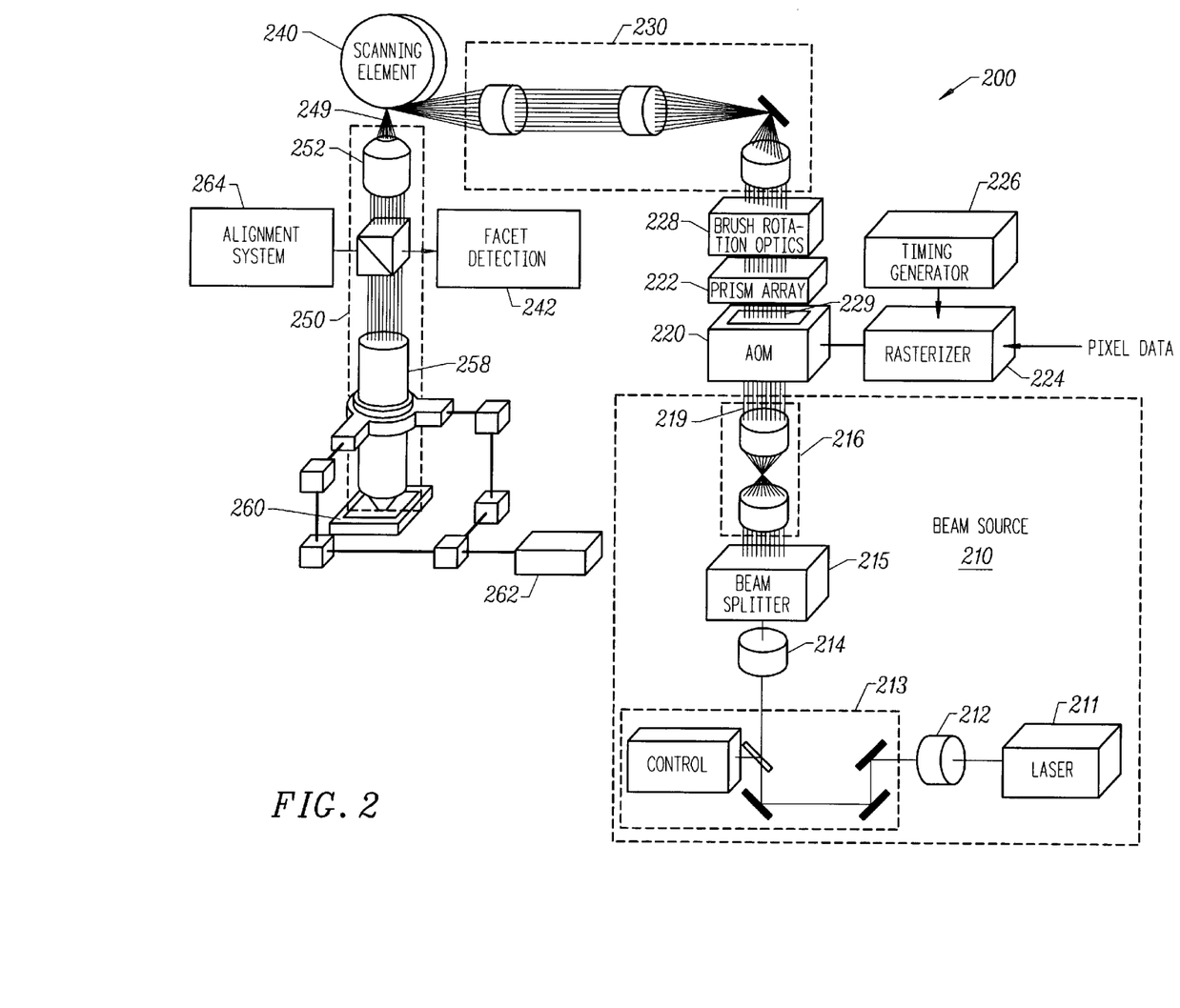
FIG. 2 shows a precision printing system incorporating a dove prism array in accordance with the invention.

FIG. 2 shows a precision printing system 200 that employs scanning in accordance with an embodiment of the invention. A prescan portion of system 200 includes a beam source 210, an acousto-optic modulator (AOM) 220, and prescan optics 230. Beam source 210 forms multiple input beams 219 having intensities which AOM 220 modulates. Prescan optics 230 direct modulated input beams 229 onto a scanning element 240. In accordance with an aspect of the invention, an optical array 222 and brush rotation optics 228 between AOM 220 and scanning element 240 change the direction in which portions of modulated beams 229 successively brighten or darken as AOM 220 turns on or shuts off the beams. Array 222 is an array of prisms or other optical elements that change the brightening directions for individual beams while preserving the orientation of a brush formed by the beams. Brush rotation optics 228, which can be a K mirror or a single dove prism, rotates the brush to the appropriate orientation for scanning and can also change the brightening directions of the individual beams.

Scanning element 240 directs multiple scan beams 249 into post-scan optics 250. Scanning element 240 is preferably a rotating polygon mirror but alternatively an oscillating mirror or a rotating holographic element could be employed. Post-scan optics 250 focuses scan beams 249 as scan beams 249 sweep along scan lines on a surface of a workpiece. Post-scan optics 250 include a scan lens 252 and a reduction lens 258. In an exemplary embodiment of system 200, scan lens 252 is an f-θ lens because such lenses are known to provide a uniform scanning rates. Scan lens 252 can alternatively be another type of lens such as a f-sin θ lens, which reduces scan line bow for extended scan brushes but causes the scan rate to be non-uniform. Reduction lens 258 reduces the scan line and resulting image size as required for the image to be formed on the workpiece. For the exemplary embodiment, the workpiece is a mask, a reticule, an unprocessed wafer, or a partially processed wafer that is coated with a layer of photoresist. A precision stage system 260 which is connected to an interferometer 262 and an alignment system 264 positions and moves the workpiece as required for alignment and indexing of scan lines. Alignment system 264 identifies the positions of alignment marks on the workpiece as viewed through reduction lens 258 and accordingly determines the position of the alignment relative to the scan lines. Interferometer 262 monitors the movement of the workpiece for indexing.

Beam source 210 includes a light source 211, beam-shaping elements 212 and 214, a beam steering system 213, a beam splitter 215, and brush optics (or telescope) 216. Light source 211 is preferably a laser that generates a coherent beam of suitable power and wavelength for the printing performed. In the exemplary embodiment of the invention, light source 211 is a laser that produces a monochromatic beam of deep ultraviolet light having power greater than about 0.1 W. For example, a "Sabre Fred" system available from Coherent, Inc. delivers 0.5 W beam at 244 nm or 257 nm. Such deep UV lasers have a resonant cavity free of oxygen and moisture to prevent formation of ozone and degradation of the BBO crystal. These lasers with appropriate components in the rest of system 200 can achieve a minimum feature size of 360 nm with a uniformity of ±20 nm and a placement accuracy of less than 20 nm at exposure doses up to 200 mJ/cm$^2$ using multiple pass printing. The environment for the optical system and workpiece is a clean environment that is kept at a temperature controlled to ±0.05° C. High purity nitrogen is a suitable purge gas where required.

Beam preparation optics 212 and beam steering system 213 direct the beam from light source 211 to beam splitter 215 which splits the beam into multiple input beams 219 for AOM 220. Beams 219 form a "brush" for simultaneous illumination of multiple scan lines. In the exemplary embodiment, beam splitter 215 and telescope 216 form thirty-two input beams 219 which are along a line with a 404.8-$\mu$m on center spacing. The center two beams are separated by an extra 202.4 $\mu$m (one half the normal spacing) for a total of 607.2 $\mu$m. The separation provides gaps between input beams 219 sufficient for AOM 220 to modulate the intensity of each beam independently. Rotation optics 228 rotates the brush so that, in the image plane of system 200, the projections of beams 219 along the scan direction overlap so that the scan brush illuminates a continuous strip with some overlap of the separate scan lines. Additionally, after scan across a set of 32 scan lines, the entire brush is indexed (moved in the image perpendicular to the scan direction) by half the width of the brush. The larger spacing between the center beams of the brush causes beams in the top half of the brush in a subsequent scan to be interleaved with beams the lower half of the brush in the previous scan. This provides a more uniform illumination for smoother imaging.

AOM 220 is a block of material such as fused silica having a patterned layer of lithium niobate bonded to one surface. Electric signals applied to the contacts lithographically defined in a conductive layer over the lithium niobate layer create multiple acoustic waves. Each acoustic wave propagates through the path of an associated input beam in the block, deflects the associated input beam, and controls the intensity reaching an aperture that selects only the diffracted beam. A rasterizer 224 generates the signals that create the acoustic waves and as a result controls the intensity of modulated beams 229. In particular, rasterizer 224 divides each scan line into pixels and generates the signals as required for each pixel to have a desired intensity. A timing generator 226 generates a pixel clock signal that is synchronized with the movement of the scan beams. A facet detection system 242 detects the orientation of scanning element 240 to identify the beginnings of scan lines. While a scan beam sweeps across a scan line, timing generator 226 generates the pixel clock for the scan line. If the motion of scanning element 240 and the characteristics of post-scan optics 250 cause the scan beams to scan at a uniform rate, the pixel clock signal is uniform. Otherwise, the pixel clock period can vary according to variations in the scan rate. Co-filed patent App. Ser. No. UNKNOWN describes a timing generator suitable for systems having a non-uniform scan rate.

Figure 3A:
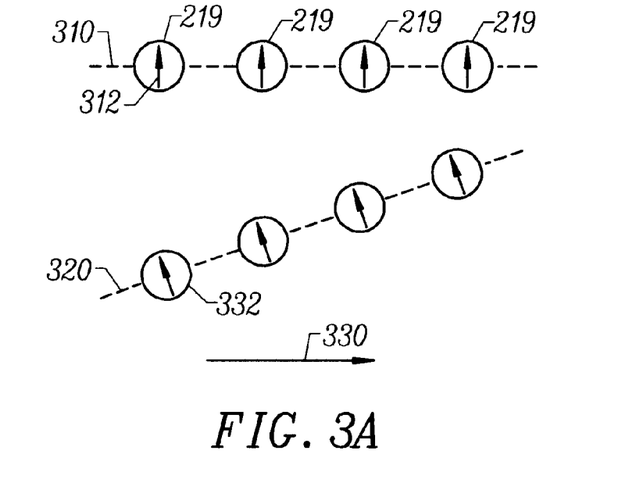
FIGS. 3A and 3B respectively illustrate rotation of multiple scan beams by a single dove prism and by a combination of a large dove prism and an array of dove prisms in accordance with the invention.
Figure 3B:
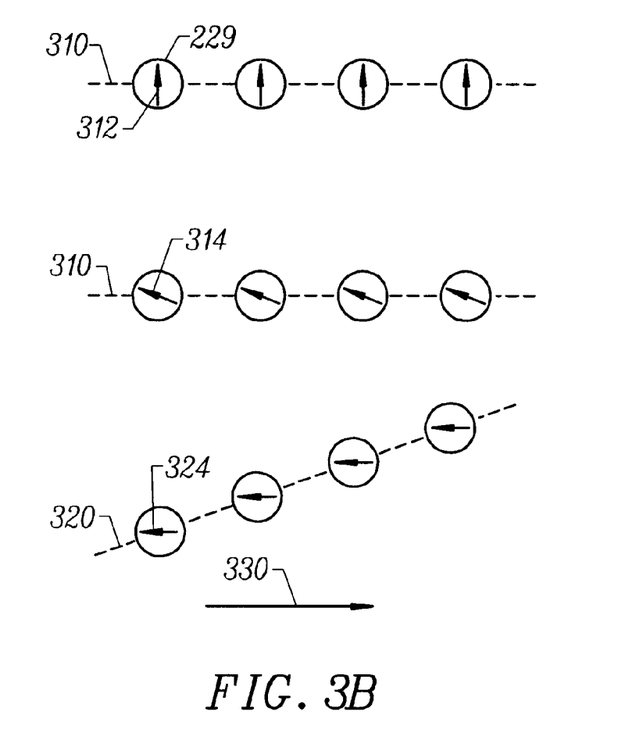

To provide the maximum space for separate acoustic waves that separately control individual beam intensities, the acoustic wave propagate along a direction perpendicular to the line of input beams 229. FIG. 3A illustrates input beams 219 that are in a line 310 with the direction 312 of propagation of the acoustic waves perpendicular to line 310. Direction 312 is the direction in which successive portions of beam 229 become illuminated as AOM 220 turns on the beam and is sometimes referred to herein as a brightening direction. If array 222 were not present, a brush rotation optics 228, which rotates line 310 to a line 320 relative to scan direction 330, would rotate brightening direction 312 by the same amount. Accordingly, a direction 322 in which beam cross-sections brighten would be perpendicular to line 320 and at angle to scan direction 330 as shown in FIG. 3A. This would blur edges, skew rectangles, and create a 45°/135° bias in the scanned image as described above. In system 200, array 222 separately rotates the brightening direction 312 of each modulated beam 229. For example, as illustrated in FIG. 3B, array 222 rotates the brightening direction 312 of modulated beams 229 in line 310 to a brightening direction 314 while keeping modulated beams 229 in line 310. Direction 314 is such that when brush rotation optics 228 rotate line 310 to line 320, the beam cross-sections brighten along a direction 324 that is opposite scan direction 330.

Figure 4:
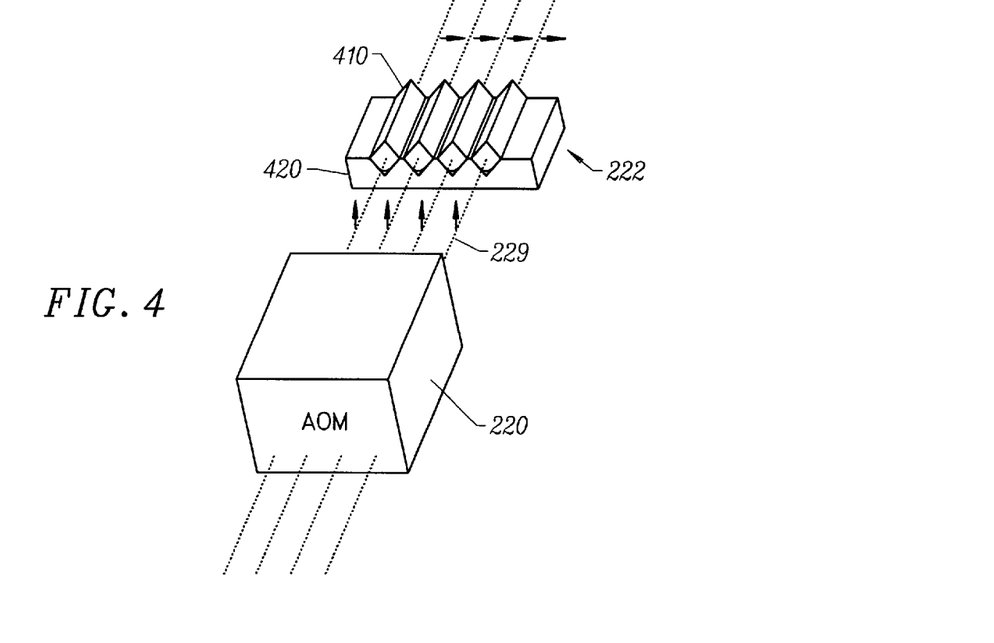
FIG. 4 shows an orientation of an acousto-optic modulator and an array of dove prisms in accordance with the invention.

Array 222 should be positioned in the paths of modulated beams 229 where beams 229 are tightly collimated or focused. As shown in FIG. 2, array 222 is immediately adjacent or part of AOM 220. Alternatively, array 222 can be at or near a focus in prescan optics 230. FIG. 4 shows a possible orientation of AOM 220 and array 222. As shown, each modulated beam 229 from AOM 220 has in array 222 an associated dove prism 410 that rotates the brightening direction for that beam. In the exemplary embodiment, beams 229 and dove prisms 410 are 404.8 $\mu$m apart on center to match the separation of beams in the brush. Each prism 410 is formed as described below from a cylindrical rod approximately 400 $\mu$m in diameter. Beams 229 have a cross-section preferably less than about 150 $\mu$m in diameter.

Figure 5:
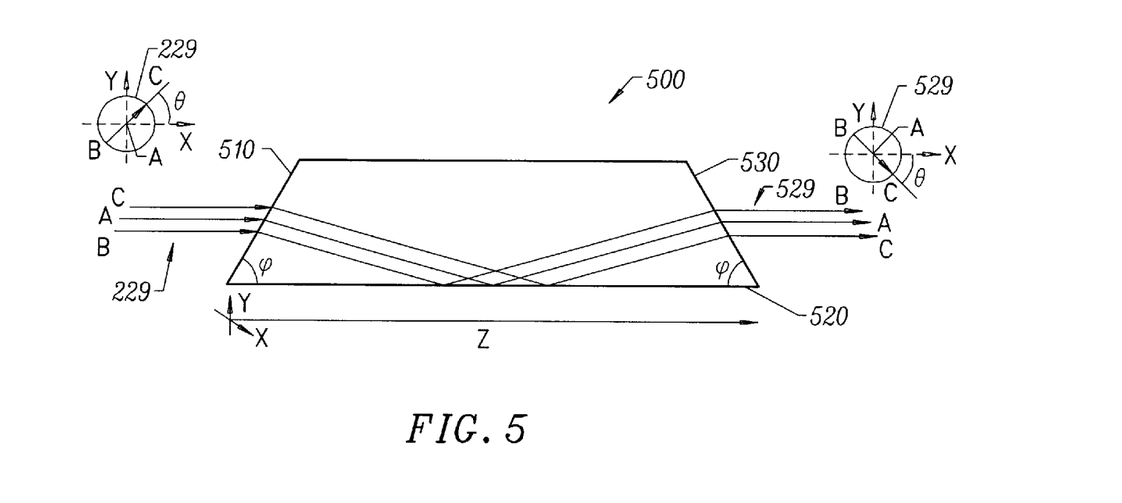
FIG. 5 illustrates the operation of a dove prism on a modulated beam.

FIG. 5 illustrates the operation of a dove prism 500 on a beam 229. Prism 500 has a three flat facets 510, 520, and 530 that affect the transmission of modulated beam 229. Base facet 520 is parallel to an x-z plane where the z axis is parallel to the incident direction of beam 229. Front and back facets 510 and 520 are an angle $\phi$ with the x-z plane and at an angle (90°-$\phi$) with an x-y plane. Beam 229 has a brightening direction at an angle $\theta$ with the base facet 520, and in the cross-section of beam 229, brightening illuminates a ray B before a central ray A and ray A before a ray C. As shown in FIG. 5, rays A, B, and C are refracted at facet 510, experience total internal reflection at facet 520, and are refracted at surface 530. Because of the total internal reflection, an exit beam 529 has a brightening direction with a y component that is the negative of the y component of the brightening direction of beam 229. Thus, dove prism 500 effectively rotates the brightening direction of beam 229 by an angle of 2$\theta$. Ideally, exit beam 529 is otherwise the same as incident beam 229, i.e., exit beam 529 propagates along the same line as incident beam 229. However, if the angle (nominally $\phi$) facet 510 makes with base facet 520 differs from the angle (also nominally $\phi$) facet 530 makes with base facet 520, beams 229 and 559 propagate in slightly different directions. Additionally, dove prism 500 shifts exit beam 529 in the y direction unless the incident position of beam 229 and the length of dove prism 500 cause reflection of central ray A from the exact mid-point of prism 500.

Changes in position and direction of beams 229 in array 222 are not critical if each beam experiences the same change. To achieve only uniform changes, dove prisms 410 of FIG. 4 are identical, as nearly as possible, and have common alignment with beams 229. FIGS. 6, 7, 8, and 9 illustrate a method for making a dove prism array that provides only uniform changes in beam position and direction across a multi-beam scanning brush.

Figure 6:
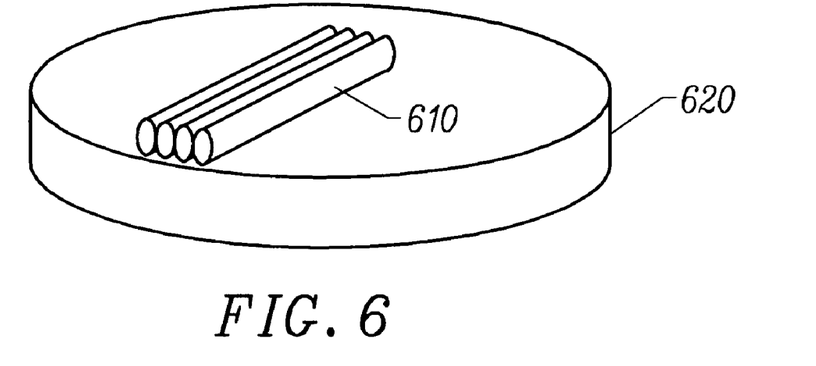
FIGS. 6 and 7 show an assembly including rods and a flat before and after polishing to convert the rods into dove prisms during a process in accordance with the invention.
Figure 7:
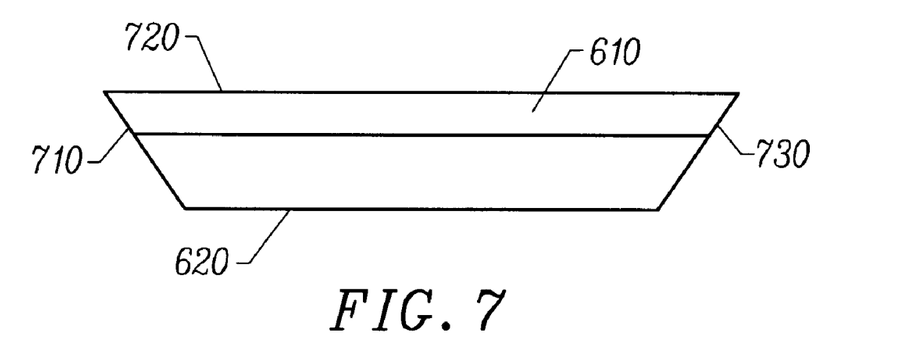
Figure 8:
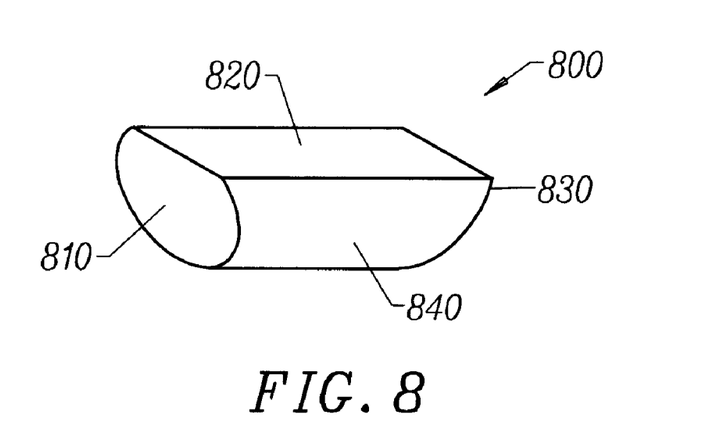
FIG. 8 shows a dove prism removed from the assembly of FIGS. 6 and 7.

FIG. 6 illustrates an initial step for forming multiple dove prisms having uniform geometry. The initial step bonds rods 610 to a precision optical flat 620 using an adhesive or optical pitch. Rods 610 may be fiber optic material, glass, fused silica, quartz, or any sufficiently transparent material capable of withstanding the required power and wavelength of light in beams 229. Rods 610 are in contact with each other to keeps rods 610 parallel to each other. The rods have a diameter that is controlled to submicron accuracy and on the order of 300 $\mu$m to 400 $\mu$m. A second step of the process grinds or polishes the combined assembly of rods 610 and flat 620 to create flat surfaces 710, 720, and 730 as shown in FIG. 7. Surface 720 is on the top of rods 610 and parallel to flat 620. Surfaces 710 and 730 are at the ends of rods 610 and at an angel with surface 720 sufficient to refract an incident beam to surface 720 for total internal reflection. After grinding, rods 610 are removed from optical flat 620 to provide multiple matched dove prisms such as dove prism 800 of FIG. 8. Dove prism 800 has facets 810, 820, and 830 that correspond to the facets 510, 520, and 530 of FIG. 5 described above. Dove prism 800 also has a rounded (portion of a cylinder) surface 840 that is not involved in the optical operation of a dove prism. The dove prisms formed in a batch as described here are nearly identical with any geometric errors likely to be common to all of the prisms.

Figure 9:
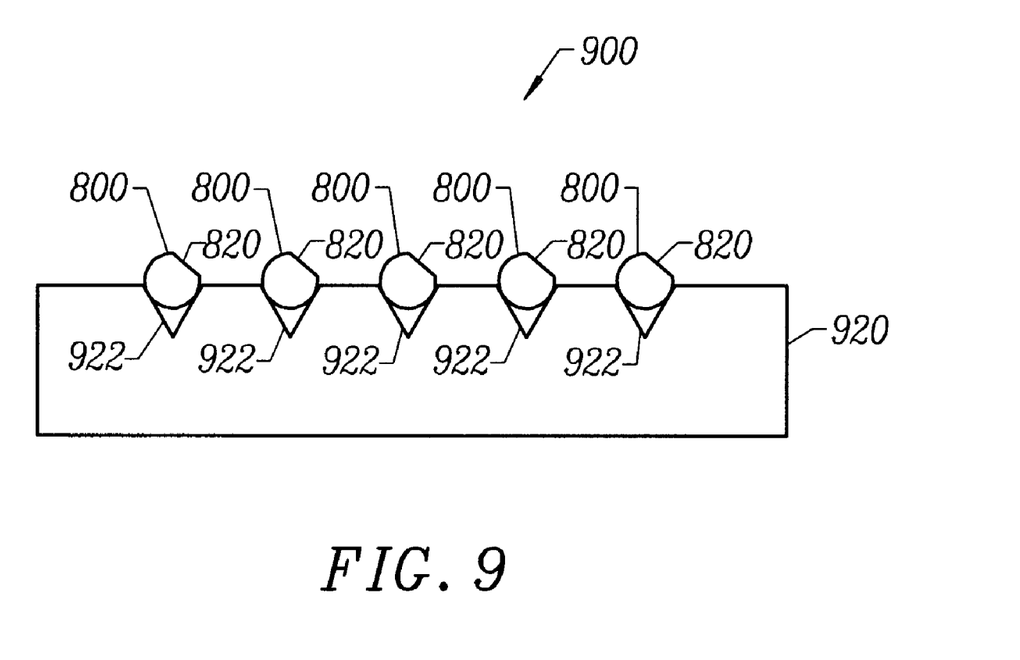
FIG. 9 shows a dove prism array where in accordance with an aspect of the invention, dove prisms are mounted in grooves formed in a substrate.

FIG. 9 shows a cross-section of a completed dove prism array 900. To complete the array, photolithography techniques known from integrated circuit manufacturing processes mask a polished silicon wafer 920 for etching of precisely spaced grooves 922 of uniform size. In an exemplary, embodiment grooves 922 are v grooves formed by etching with potassium hydroxide (KOH). Each previously formed rod 800 has its rounded surface 840 in one of grooves 922. Rods 800 are rotated so that the normals to flat surfaces 820 are at an angle θ with the brightening directions of associated beams 229. The resulting rotation of the brightening directions is 2θ. Grooves 922 precisely fix the locations of the central axes of rods 800 so that the direction and position of the central axes are well controlled. The rotations and placement along the length of grooves 922 can vary from rod to rod. The effects of such variations are not critical. In particular, placement error along the channel only has a second order effect on the positions of the beams that is dependent on angular error in the orientation of the front and back facets. Variation in the rotations of facets 820 affect how close the brightening directions will be to opposite the scanning direction, but an error of a degree or less is a relatively small effect when compared to uncorrected case where the brightening direction can be nearly 90° from the scanning direction.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A scanning system comprising:
   a source of multiple beams;
   a modulator positioned to separately control intensities of the multiple beams;
   an array of dove prisms, wherein each of the multiple beams is associated with one of the dove prism in the array, the array being positioned so that each of the multiple beams from the modulator is incident on and passes through the associated dove prism;
   a scanning element that sweeps the multiple beams along a scanning direction; and
   post-scan optics that direct the multiple beams to form scan lines in an image plane.

2. The system of claim 1, wherein:
   when the modulator turns on one of the multiple beams, successive areas that become illuminated in a cross-section of the beam progress in a first direction; and
   each dove prism acts on the associated one of the multiple beams to change the successive areas that become illuminated from progressing in the first direction to progressing in a second direction.

3. The system of claim 2, wherein the second direction is such that in the scan lines, when the modulator turns on one of the multiple beams, successive areas that become illuminated in the cross-section of the beam progress in a direction opposite the scanning direction.

4. The system of claim 1, wherein the array of dove prism comprises:
   a substrate having a plurality of grooves in a surface; and
   a plurality of dove prisms, each dove prism being at least partly disposed in an associated one of the grooves in the surface of the substrate.

5. The system of claim 4, wherein each dove prism has a base facet that extends parallel to a groove in which the dove prism is at least partly disposed.

6. The system of claim 5, wherein each base facet is at an angle relative to the surface of the substrate, and each dove prism rotates its associated beam by twice the angle.

7. A scanning system comprising:
   a beam source to direct a beam along a path;
   a modulator positioned in the path defining a brightening direction that is associated with the beam, the brightening direction having a first orientation;
   a reorientation optic disposed within the path to rotate the brightening direction, defining a second orientation, with the second orientation extending transversely to the first orientation;
   a scanning element to scan the beam along a first tenor, with the first tenor being parallel to the second orientation, with the brightening direction in the second orientation extending along a first direction and the first tenor extending along a second direction, opposite to the first direction; and
   post-scan optics that direct the beam to form a scan line.

8. The system of claim 7 wherein the beam source directs multiple beams along multiple paths, with the modulator lying within the multiple paths defining a brightening direction that is associated with each of the multiple beams and the reorientation optic being disposed within the multiple paths to rotate the brightening direction to lie in the second orientation.

9. The system of claim 7 wherein the reorientation optic includes a dove prism.

10. The system of claim 9 wherein the dove prism includes a substrate, having a groove formed therein, and an optical fiber having a curved portion and a planar portion, with the groove defining a pair of oblique sides extending from a common point, defining a nadir, and terminating in an opening, with the curved portion lying against the pair of oblique sides and the planar portion facing away from the nadir.

11. The system of claim 10 wherein a normal to the planar portion forms an angle θ with respect to the brightening direction with an angular difference between the first and second orientations being approximately 2θ.

12. The system of claim 8 wherein the reorientation optic includes an array of dove prisms, with each of the multiple beams impinging upon one of the prisms of the array of dove prisms.

13. The system of claim 12 wherein the array of dove prisms includes a substrate, having a plurality of grooves formed therein, and a plurality of optical fibers, each of which have a curved portion and a planar portion, with each of the plurality of grooves defining a pair of oblique sides extending from a common point, defining a nadir, and terminating in an opening, with the curved portion lying against the pair of oblique sides and the planar portion facing away from the nadir.

14. The system of claim 13 wherein a normal to the planar portion forms an angle θ with respect to the brightening direction with an angular difference between the first and second orientations being approximately 2θ.

15. A scanning system comprising:
   a beam source to direct multiple beams along multiple paths,
   a modulator positioned in the multiple paths defining a brightening direction that is associated with the beams, the brightening direction having a first orientation;
   a reorientation optic disposed within the multiple paths to rotate the brightening direction, defining a second orientation, with the second orientation extending transversely to the first orientation;
   a scanning element to scan the multiple beams along a first tenor, with the first tenor being parallel to the second orientation, the brightening direction in the second orientation extending along a first direction, with the first tenor extending alone a second direction, opposite to the first direction; and
   post-scan optics that direct the beams to form a scan line.

16. The system of claim 15 wherein the reorientation optic includes an array of dove prisms, with each of the multiple beams impinging upon one of the prisms of the array of dove prisms.

17. The system of claim 16 wherein the array of dove prisms includes a substrate, having a plurality of grooves formed therein, and a plurality of optical fibers, each of which have a curved portion and a planar portion, with each of the plurality of grooves defining a pair of oblique sides extending from a common point, defining a nadir, and terminating in an opening, with the curved portion lying against the pair of oblique sides and the planar portion facing away from the nadir.

18. The system of claim 17 wherein a normal to the planar portion forms an angle θ with respect to the brightening direction with an angular difference between the first and second orientations being approximately 2θ.

19. A scanning system comprising:
   a beam source to direct a beam along a path;
   a modulator positioned in the path defining a brightening direction that is associated with the beam, the brightening direction having a first orientation;
   a reorientation optic including a dove prism disposed within the path to rotate the brightening direction, defining a second orientation, with the second orientation extending transversely to the first orientation, said dove prism comprising a substrate, having a groove formed therein, and an optical fiber having a curved portion and a planar portion, with the groove defining a pair of oblique sides extending from a common point, defining a nadir, and terminating in an opening, with the curved portion lying against the pair of oblique sides and the planar portion facing away from the nadir;
   a scanning element to scan the beam along a first tenor, with the first tenor being parallel to the second orientation; and
   post-scan optics that direct the beam to form a scan line.

20. The system of claim 19 wherein the beam source directs multiple beams along multiple paths, with the modulator lying within the multiple paths defining a brightening direction that is associated with each of the multiple beams and the reorientation optic including multiple dove prisms disposed in the multiple paths to rotate the brightening direction to lie in the second orientation.

21. The system of claim 19 wherein a normal to the planar portion forms an angle θ with respect to the brightening direction with an angular difference between the first and second orientations being approximately 2θ.

* * * * *